(12) United States Patent
Bessis

(10) Patent No.: US 8,189,570 B2
(45) Date of Patent: May 29, 2012

(54) SYSTEM AND METHOD FOR PROCESSING CALLS TO VOIP DEVICES USING THE CALLED PARTY'S EMAIL ADDRESS

(75) Inventor: Thierry Bessis, Naperville, IL (US)

(73) Assignee: Alcatel Lucent, Paris (FR)

( * ) Notice: Subject to any disclaimer, the term of this patent is extended or adjusted under 35 U.S.C. 154(b) by 1552 days.

(21) Appl. No.: 11/617,100

(22) Filed: Dec. 28, 2006

(65) Prior Publication Data

US 2008/0159261 A1 Jul. 3, 2008

(51) Int. Cl.
*H04L 12/50* (2006.01)
(52) U.S. Cl. ........ 370/353; 370/351; 370/352; 370/354; 370/355; 370/356; 379/242
(58) Field of Classification Search .......................... None
See application file for complete search history.

(56) References Cited

U.S. PATENT DOCUMENTS

| | | | |
|---|---|---|---|
| 6,678,265 B1 * | 1/2004 | Kung et al. | 370/352 |
| 7,822,612 B1 * | 10/2010 | Goodheart | 704/275 |
| 2003/0046405 A1 * | 3/2003 | O'Neill et al. | 709/228 |
| 2004/0199649 A1 * | 10/2004 | Tarnanen et al. | 709/230 |
| 2004/0230665 A1 | 11/2004 | Xiao et al. | |
| 2005/0041647 A1 * | 2/2005 | Stinnie | 370/352 |
| 2005/0141690 A1 | 6/2005 | Wengrovitz | |
| 2005/0141691 A1 | 6/2005 | Wengrovitz | |
| 2005/0246419 A1 | 11/2005 | Jaatinen | |
| 2006/0034270 A1 | 2/2006 | Haase et al. | |
| 2006/0041581 A1 * | 2/2006 | Aghvami et al. | 707/102 |
| 2008/0037720 A1 * | 2/2008 | Thomson et al. | 379/88.01 |
| 2008/0125077 A1 * | 5/2008 | Velazquez et al. | 455/404.2 |

* cited by examiner

*Primary Examiner* — Jae Y Lee
(74) *Attorney, Agent, or Firm* — Fay Sharpe LLP

(57) ABSTRACT

Systems and methods are disclosed for system for processing calls to a SIP or VoIP device using the called party's Email address in which a call redirect server component is provisioned with the called party's Email address and VoIP or SIP device address, and a DNS system is updated with the called party's Email address and an address of the call redirect server. VoIP calls or other SIP sessions directed to the called party's Email address are resolved by the DNS system to the address of the redirect server, which in turn redirects the calls to the called party's VoIP or SIP device. The subscriber called party may provision the call redirect server with updated Email address or VoIP or SIP device address information to allow the subscribed to change VoIP phone service providers while callers only need to remember the subscriber's Email address.

7 Claims, 5 Drawing Sheets

SYSTEM AND METHOD FOR PROCESSING CALLS TO VOIP DEVICES USING THE CALLED PARTY'S EMAIL ADDRESS

BACKGROUND OF THE INVENTION

The present invention relates generally to telephony and more particularly to call processing for Voice Over IP (VoIP) devices and processing of other media sessions using SIP devices. VoIP devices allow telephony services to be provided over packet switched networks such as the Internet and other data networks, and thus provide flexibility that cannot be achieved by plain old telephone system (POTS) legacy telephones that use circuit switched systems such as the public switched telephone network (PSTN). Rather than connecting a VoIP device to a fixed telephone line, the device can be connected to the Internet at any location. In addition, VoIP devices offer potential cost savings for voice calls, particularly for long distance calls, lower overall network costs for businesses since voice and data are carried over the same network, and flexibility in relocating phones. VoIP devices include so-called SIP phones that communicate according to the IETF standard session initiation protocol (SIP) and other devices such as those employing the ITU standard H.323 protocol. Because these devices communicate via packet-switched networks, calls placed to a VoIP device must specify a universal resource identifier (URI) such as a SIP URI to allow proper routing of the call packets through the network. In addition to voice calls, SIP devices and other VoIP devices may support other types of sessions, such as multimedia distribution, multimedia conferences, etc., where the SIP protocol is an application-layer control (signaling) protocol for creating, modifying, and terminating sessions with one or more participants.

One shortcoming of SIP phones and VoIP devices generally is that persons wishing to call a SIP device must know the URI (e.g., SIP URI) of the device they are calling or a legacy phone number assigned to the device. The URI is generally in the form user1@VoIP-provider-1.com like an Email address, wherein SIP, Email and other IP applications use URI for addressing purposes. The SIP URI and any legacy phone number are assigned by the subscriber's VoIP service provider, and accordingly change whenever the user switches to a new provider. When a VoIP user wants to receive calls from friends, family, colleagues, etc., he or she must advertise his or her SIP URI and/or the legacy number to each such person, which can take a lot of time. This problem is similar to the situation where a person gets a brand new telephone number for a legacy or mobile phone. For legacy telephones, so-called "Number Portability" techniques and systems have been developed to allow persons to retain their old legacy telephone number even though they change service providers. However, there is currently no analogous solution providing VoIP URI portability and number portability is not common outside the United States. Another problem with conventional VoIP services is that the VoIP device needs to be assigned a legacy phone number, in addition to the SIP URI, so that voice calls can be received from legacy callers via the PSTN. PSTN phone numbers are scarce and expensive resources, and the "Number Portability" and other regulatory features that go with them are expensive and cumbersome. Thus, there remains a need for systems and methods by which VoIP device users could use their existing and well-known Email address as a SIP URI, and do not need to update all preferred calling parties with new URIs and/or legacy phone numbers whenever they switch VoIP phone service providers.

SUMMARY OF THE INVENTION

The following is a summary of one or more aspects of the invention provided in order to facilitate a basic understanding thereof, wherein this summary is not an extensive overview of the invention, and is intended neither to identify certain elements of the invention, nor to delineate the scope of the invention. The primary purpose of the summary is, rather, to present some concepts of the invention in a simplified form prior to the more detailed description that is presented hereinafter.

The various aspects of the present disclosure relate to call processing for placing voice and other media calls or sessions to VoIP or other SIP devices by which the called party's Email address can be used in lieu of the corresponding SIP URI or a device specific legacy number. The provision of VoIP or other SIP connectivity using an Email address provides the advantage that the Email address assigned by most major web portals is typically portable and thus typically remains the same for a long time. As a result, the Email address is often well known by relatives, friends, and colleagues. Moreover, it is expedient to advertise only one address for both Emails and VoIP/SIP calls, and an Email address book listing can be used as a VoIP phone book by VoIP devices. Moreover, the invention also allows VoIP or other SIP devices to be called by legacy phones using the called party's Email address or username instead of using a legacy phone number. Toward these ends, call processing methods and systems are provided in which a call redirect server component is provisioned with a subscriber's Email address and VoIP or SIP device address, where the redirect server may be operated by a major Email/WEB portal operator (e.g., like Yahoo, Google, etc.) or may be separately operated elsewhere in the network. A domain name system (DNS) server is provided with the called party's Email address and an address of the call redirect server to allow URI resolution from the Email address to the redirect server, which then redirects incoming calls to the called party's VoIP device. The system thus allows a call to be placed with the Email address, without the need for the caller to know the subscriber's legacy number or the VoIP (SIP) URI.

In accordance with one or more aspects of the present disclosure, a system is provided for processing calls to a VoIP device, such as a SIP phone. The system includes a call redirect component such as a server in one implementation that is provisioned with the called party's Email address and the called party's VoIP device address, such as a SIP URI. A call redirect service logic component that may be implemented in the call direct component updates a DNS system with the called party's Email address and the address of the call redirect service logic and operates to redirect calls associated with the called party's Email address to the called party's VoIP device address. The call redirect component and the call redirect service logic may be operatively associated with a web portal of the called party's Email service provider in certain embodiments, and the redirect component may allow the called party to update his or her VoIP device address, for instance when it changes its VoIP provider. In certain embodiments, moreover, the system also includes a PSTN gateway to receives legacy calls to a gateway legacy number and obtains audio called party username or Email address information from the caller, such as through voice recognition when the caller is prompted to say or spell the called party's Email address or user name. The audio information is then correlated with the called party's VoIP or SIP device address, either directly or through the redirect server, and the call is forwarded to the called party's VoIP or SIP device.

Further aspects of the disclosure provide a method of processing calls to a VoIP or SIP device using the called party's Email address. The method includes receiving a call to a called party's Email address, resolving the called party's Email address as a SIP URI to obtain an address of a call redirect component, processing the call using the call redirect component address, providing the called party's VoIP or SIP device address, and redirecting the call to the called party's VoIP device. In certain embodiments of the method, the called party's Email address is resolved by a DNS system updated with the called party's Email address and the call redirect component address. The method may further include allowing the called party to provision the call redirect component with the VoIP or SIP device address, such as when the user changes VoIP service providers. In this manner, the subscriber can continue to receive VoIP or SIP calls placed using their unchanged Email address without having to advertise the new VoIP URI. The method may also provide for receiving the call at a PSTN gateway associated with the call redirect component, allowing callers to provide audio called party username or Email address information, correlating the username or Email address with the called party's VoIP device address, and forwarding the call to the called party's VoIP device.

Still other aspects of the disclosure provide a VoIP or SIP call processing method that includes receiving a call to a PSTN gateway legacy telephone number, receiving audio called party username or Email address information from the calling party, correlating the called party username or Email address information with the called party's VoIP or SIP device address, and forwarding the call to the called party's VoIP or SIP device. The audio information correlation may include resolving the called party's Email address (as a SIP URI) to obtain an address of a call redirect component, processing the call using the call redirect component address, and at the call redirect component, providing the called party's VoIP or SIP device address, where the call forwarding includes redirecting the call to the called party's VoIP or SIP device.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings. The present invention may be embodied in the construction, configuration, arrangement, and combination of the various system components and acts or events of the methods, whereby the objects contemplated are attained as hereinafter more fully set forth, specifically pointed out in the claims, and illustrated in the accompanying drawings in which:

DETAILED DESCRIPTION

Figure 1:
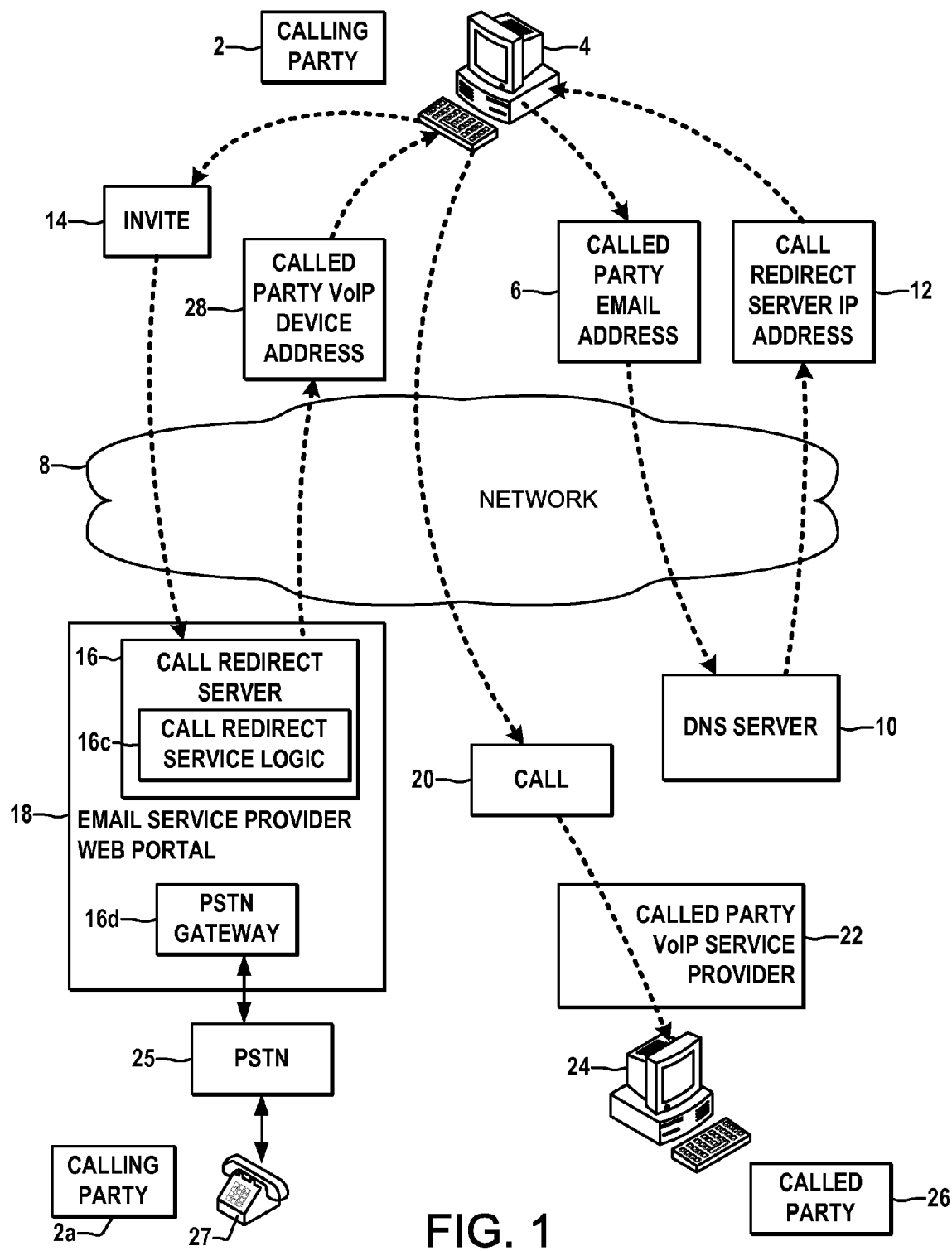
FIG. 1 is a schematic system diagram illustrating an exemplary packet-switched network in which the various aspects of the disclosure may be implemented with a VoIP call redirect server component.

Referring now to the figures, wherein the showings are for purposes of illustrating the exemplary embodiments only and not for purposes of limiting the claimed subject matter, FIG. 1 schematically illustrates an exemplary network environment in which the various aspects of the present invention may be carried out in processing voice and other calls or sessions to VoIP or SIP devices. In the illustrated example, a first calling party 2 desires to place a voice or multimedia call from a VoIP calling device 4, such as a computer, SIP phone, etc. to a SIP phone or other SIP device 24 of a called party 26, where the caller 2 may not know a SIP URI or IP address for the called party device 26, but knows the called party's Email address 6. The called party Email address 6 may be any suitable format, such as USER1@WEB-PORTAL-1.COM in the present example. A calling device will add the prefix "sip:" to the Email address URI such that the DNS is resolved for a VoIP SIP server instead of an Email box. The caller's VoIP device 4 and the called party device 24 are operatively coupled with a packet-switched network 8 such as the Internet in one embodiment. Also connected to the network 8 are a DNS server 10, a web portal 18 of the called party's Email service provider, and one or more network devices 22 operated by the called party's VoIP service provider 22.

In accordance with the present disclosure, the Email service provider's web portal 18 provides call redirect services for processing calls to the called party VoIP or SIP device 24, including a call redirect server component 16 with an integral or separate call redirect service logic component 16c. Other embodiments are possible in which a call redirect component can be implemented separately from the called party's Email service provider 18. The redirect component 16 and the logic 16c may be implemented as any suitable hardware, software, firmware, logic, or combinations thereof, and may be constructed as a single component such as a server, etc., or may be implemented in distributed fashion across two or more components operatively associated with a packet-switched network 8. Moreover, the redirect server 16 and logic 16c may be operative to perform the call redirect functionality described herein using any suitable communications protocols, including without limitation the IETF standard SIP protocol, IAX, ITU standard 4.323 protocol, etc.

Figure 2:
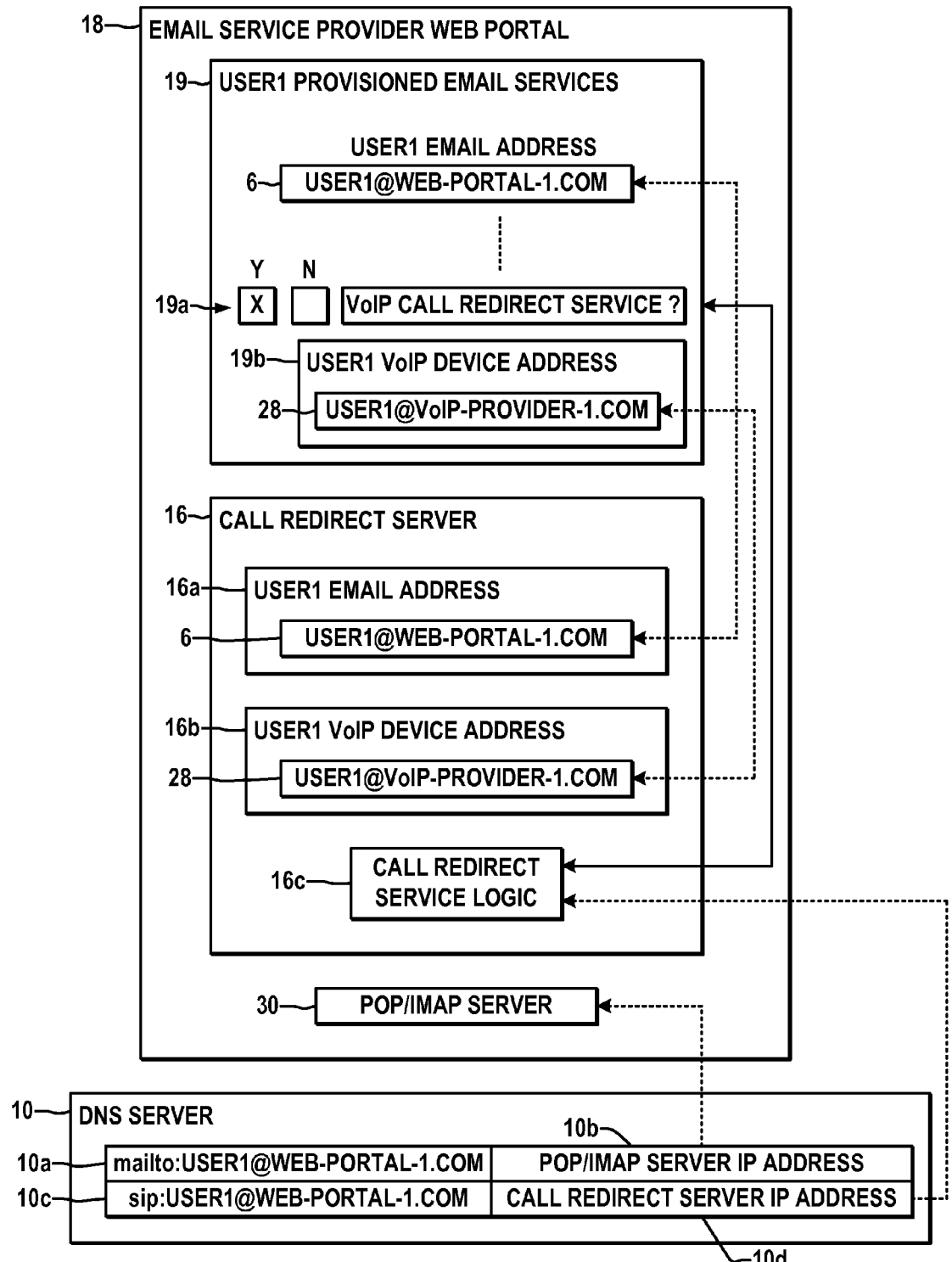
FIG. 2 is a schematic diagram illustrating further details of the call redirect and DNS servers in the system of FIG. 1.

FIG. 2 shows further details of the exemplary called party Email service provider web portal 18, at which the called party 26 (e.g., USER1 in the illustrated embodiments) may subscribe to one or more provisioned Email services 19 including selection of VoIP call redirect services at 19a of the present disclosure. When the party 26 initially subscribes to Email services with the provider 18 in this example, the Email service provider 18 assigns the subscriber an Email address 6 (e.g., USER1@WEB-PORTAL-1.COM in this example) and provisions the DNS server 10 with entries 10a (e.g., mailto: USER1@WEB-PORTAL1.com) and 10b (e.g., sip:

USER1@WEB-PORTAL1.com) for the subscriber's Email address 6 and the IP address of a POP or IMAP server 30 associated with the web portal 18 for routing Emails to the subscriber 26.

In the illustrated example of FIGS. 1 and 2, moreover, the called party 26 USER1 has further elected to subscribe to the VoIP call redirect service provided by the Email service provider 18 and has accordingly entered the SIP URI 28 (VoIP or SIP device address USER1@VoIP-PROVIDER-1.COM) of his or her VoIP or SIP device 24 into a data field 19b at the web portal 18. When the subscriber 26 has thus elected the VoIP call redirect service, the call redirect server component 16 is provisioned by the logic 16c with the called party's Email address 6 at 16a and with the called party's VoIP or SIP device address 28 at 16b. The call redirect service logic 16c also provides entries 10c and 10d to update the DNS system server 10 as shown in FIG. 2 with the called party's Email address 6 (entry 10c) and an address associated with the call redirect service logic 16c or the redirect server 16 (entry 10d). In this manner, the DNS system 10 can resolve Email resolution requests to the IP address of the POP/IMAP server 30, and can also resolve VoIP or other multimedia (SIP) session resolution requests to the address of the redirect logic 16c of the redirect server 16 to allow caller 2 to place a VoIP (e.g., SIP) call to the subscriber 26 knowing only the subscriber's Email address 6. The service logic 16c, in turn, will redirect such calls to the called party's VoIP or SIP device address 28.

Returning to FIG. 1, in operation, a first calling party 2 initiates a VoIP call from his or her VoIP device 4 to the called party's Email address 6 (USER1@WEB-PORTAL-1.COM), and requests the DNS server 10 to resolve this SIP URI 6 into an IP address. By the DNS entry 10c and 10d (FIG. 2), the DNS server 10 recognizes the resolution request as relating to a SIP or other VoIP call (as opposed to Email), and accordingly resolves the Email address 6 to the IP address 12 of the call redirect server 16 or server logic 16c, which is then returned to the caller's VoIP or SIP device 4. With this address resolution result, the calling party device 4 begins processing the VoIP call by sending a SIP invite 14 or other suitable call processing message to the call redirect server 16 or the logic 16c thereof. The redirect logic 16c then redirects the call 20 to the called party's VoIP device address, such as by indicating the VoIP address 28 to the caller device 4, which then sends a SIP invite to the called party's VoIP service provider 22, with normal call processing thus connecting the call 20 to the called party VoIP or SIP device 24 via the network 8 and the VoIP service provider 22.

In another embodiment of the present disclosure, a PSTN gateway 16d may be associated with the redirect component 16 as shown in FIG. 1 to facilitate processing calls from a second calling party 2a using a legacy telephone 27 to call the subscriber's VoIP or SIP device 24 through a PSTN 25, again using only the called party's Email address 6, as illustrated and described further below with respect to FIGS. 6 and 7.

Figure 3:
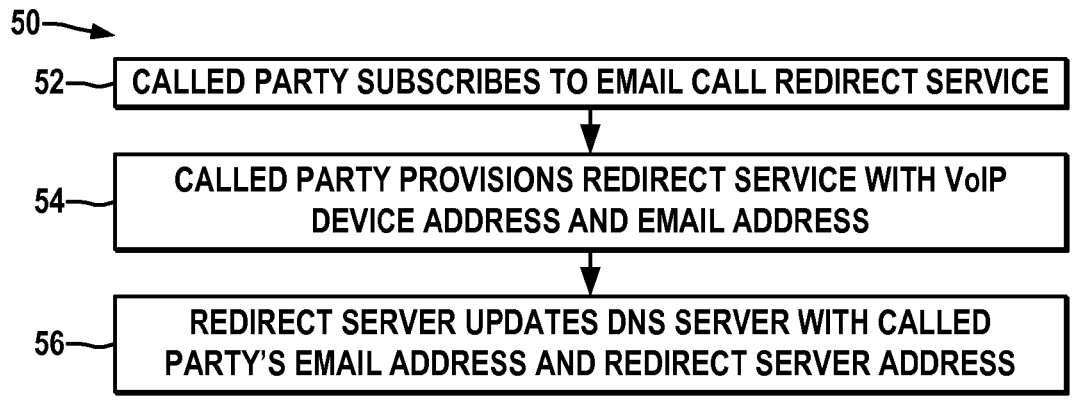
FIG. 3 is a flow diagram illustrating subscriber provisioning of the redirect server with Email and VoIP or SIP device addresses and updating of the DNS system with the Email and redirect server addresses.
Figure 4:
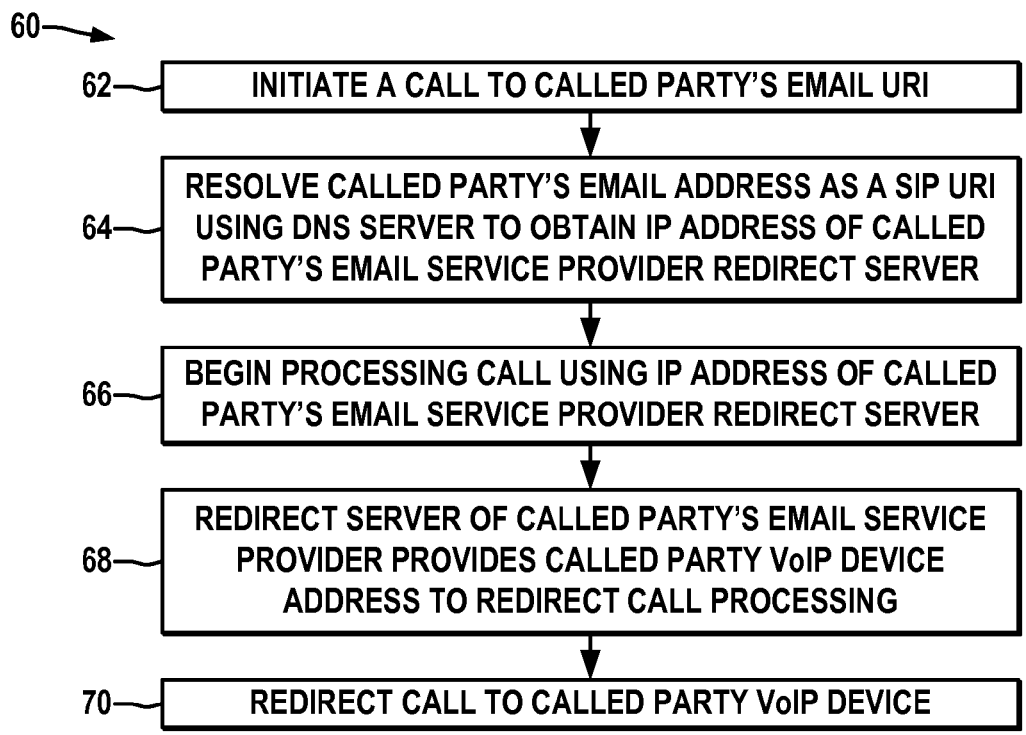
FIG. 4 is a flow diagram illustrating an exemplary VoIP call processing method in accordance with the present disclosure.

FIG. 3 illustrates an exemplary method 50 in which a called party with Email and a VoIP device can subscribe to Email services and VoIP or SIP device call redirect services in accordance with the present disclosure, and FIG. 4 depicts a method 60 for redirecting VoIP calls, where the exemplary methods 50 and 60 may be employed in association with the exemplary systems and redirect components 16 described above or with other systems. Although the exemplary methods 50, 60 and other methods of the disclosure may be presented in the form of a series of acts or events, it will be appreciated that the various methods of the invention are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present invention. The illustrated methods may be implemented in hardware, software, or combinations thereof, in order to provide VoIP session processing functions in a packet-switched processing environment such as those illustrated and described herein, although the invention is not limited to the specifically illustrated or described applications.

At 52 in FIG. 3, a called party (e.g. party 26 in FIG. 1) subscribes to Email call redirection services, for instance, with his or her Email service provider, or alternatively with a provider of redirect services that need not be associated with the party's Email service provider. At 54, the subscription process includes the called party provisioning the redirect service with one or both of the party's Email address (6) and VoIP or SIP device address (28). For example, if the redirect service is provided by the Email service provider, the subscriber 26 may not need to enter the Email address 6, but may provision the service with the VoIP or SIP device address (e.g., SIP URI) 28, for example, when changing to a new VoIP service provider 22. The redirect server 16 (or the logic 16c thereof) updates the DNS server 10 at 56 with the subscriber's Email address 6 and the address of the redirect server 16 or the logic 16c thereof. In this regard, a third party redirect service provider may enter into suitable agreements with Email service providers to allow the provider of the redirect service to update the DNS server 10 with the appropriate entries to specify the routing of SIP calls to the Email address. In addition, the subscriber may provision multiple Email addresses associated with a single VoIP or SIP device or with different devices, and the subscriber may also define screening or filtering rules for each such Email address, where the defined rules may be different for different Email addresses for selective forwarding services.

Referring also to FIG. 4, the call redirect processing method 60 includes initiating a call to a called party's Email address at 62 and resolving the called party's Email address at 64 as a SIP URI to obtain an address of a call redirect component, such as the redirect server 16 or the redirect service logic 16c in FIGS. 1 and 2 above. At 66, call processing begins using the call redirect component address, and the redirect server or logic provides the called party's VoIP device address at 68, according to which the call is redirected at 70 to the called party's VoIP device.

Figure 5:
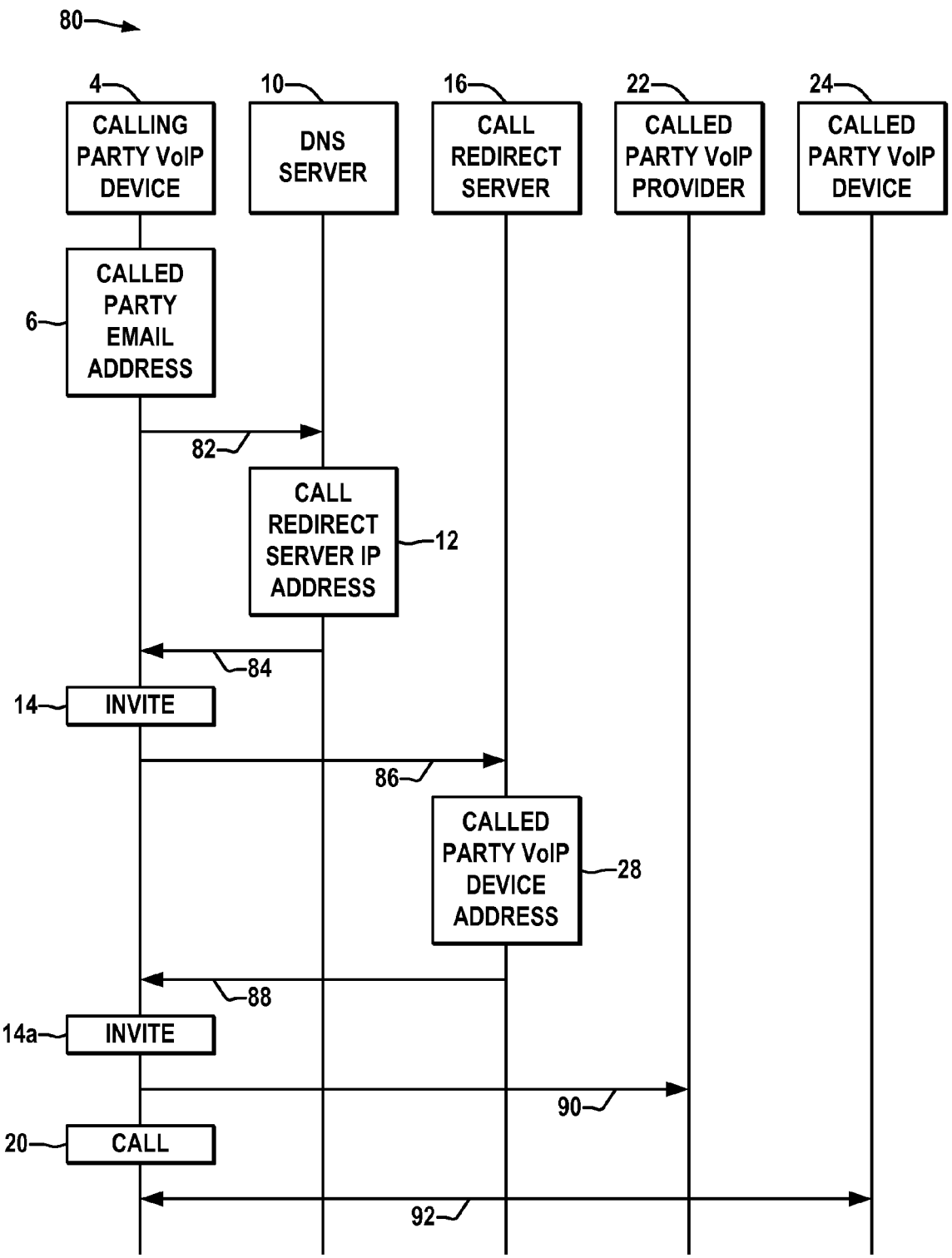
FIG. 5 is a call flow diagram illustrating exemplary processing of a VoIP call in accordance with the disclosure.

FIG. 5 illustrates an exemplary call flow diagram 80 showing call redirect processing according to an embodiment of the present disclosure, wherein the calling party's VoIP device 4 sends the called party's Email address 6 (e.g., with a "sip:" prefix) to the DNS server 10, for instance, using a URI to IP address resolution request 82. The DNS server 10 obtains the corresponding call redirect server or logic address 12 and provides this to the calling party device 4 in a response message 84. The calling party VoIP device 4 then sends a SIP invite 14 or other suitable call processing message according to a suitable protocol to the specified call redirect server 16 at 86, and the redirect component 16 (or logic 16c thereof) causes the call to be redirected by returning the called party VoIP or SIP device address 28 at 88. In this example, the calling device 4 then sends another invite 14a to the VoIP service provider 22 of the called party 24 at 90 and the call 20 is then completed at 92 between the calling and called parties 4 and 24.

The above described embodiments may find particular utility for Emails service providers 18, such as on a subscription basis, to add value to their customer's Email address, thereby encouraging long retention of Email addresses, and these functions may be combined with other features, such as selective screening of redirected calls originating at certain times, days, or from certain subscriber provisioned sources, etc., such that the called party subscriber 26 may selectively exclude certain calls from being redirected to their VoIP or SIP device 24, or may choose to have certain calls selectively forwarded to one of two or more VoIP devices, etc. In one embodiment, the Email service provider 18 allows users to create multiple Email addresses, and association of different screening rules with each Email address as described above, whereby the user can use and advertise or distribute a given Email address for "shopping", with more restricted screening rules applied to this Email address. The disclosure thus provides VoIP or SIP device users 26 with flexibility in changing service providers while mitigating the need to advertise updated SIP URIs or other forms of VoIP device addresses to family, friends, etc. by allowing continued usage of the subscriber's Email address as a means to call the VoIP phone, particularly for subscribers that have obtained their Email addresses from the major web portal service providers that implement Email address porting. In this regard, the disclosed call redirect services can advantageously add value to the Email addresses provided by web portal companies thereby increasing customer loyalty, as well as allowing provision of additional VoIP or SIP oriented services and facilitating accessibility of VoIP phones and other SIP devices 24.

Figure 6:
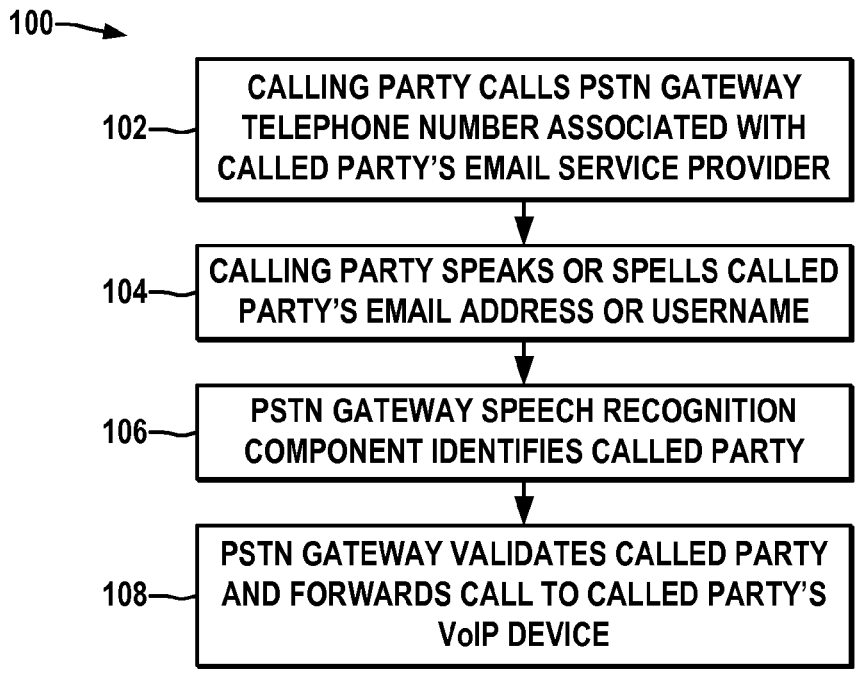
FIG. 6 is a flow diagram illustrating another exemplary call processing method according to the present disclosure with a PSTN caller speaking or spelling the called party's Email address or user name for connection to the VoIP device.
Figure 7:
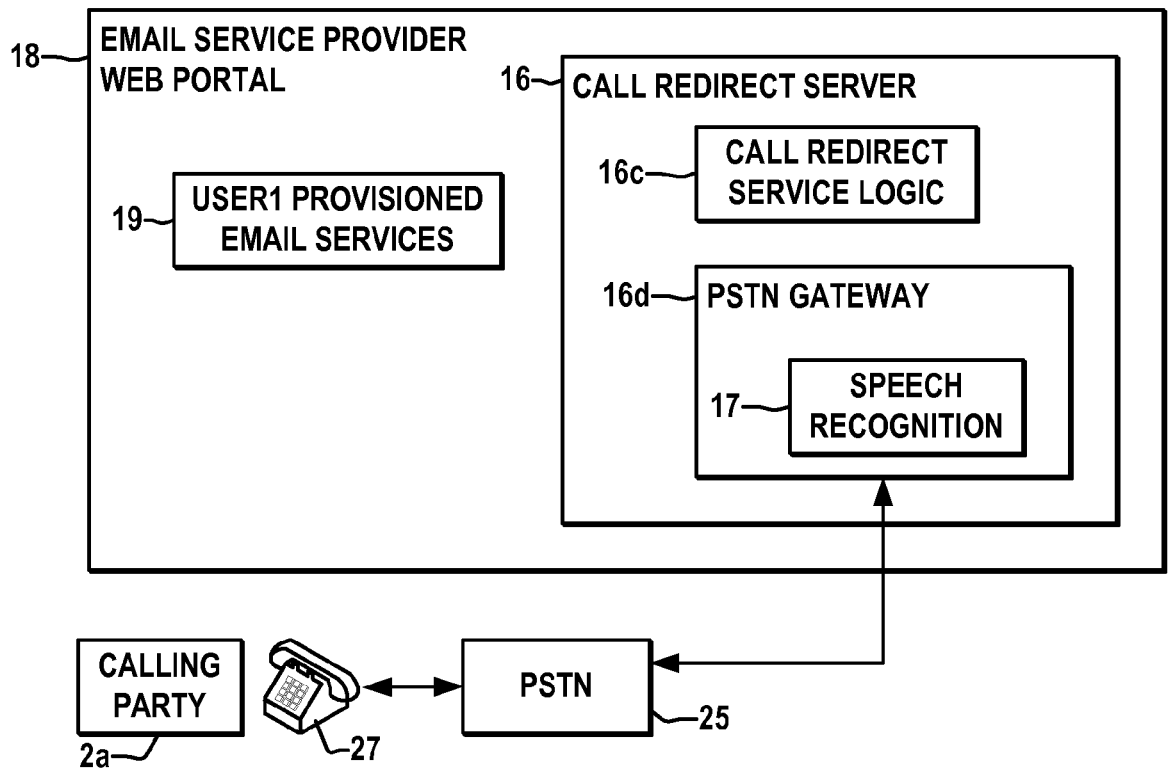
FIG. 7 is a schematic diagram illustrating further details of the exemplary redirect server including a PSTN gateway with a speech recognition component in accordance with other aspects of the disclosure.

Referring now to FIGS. 1, 6, and 7, the disclosure further provides a solution for SIP subscribers 26 to be called from the PSTN 25 without the need to be assigned a legacy phone number. Previously, a legacy phone number had to be called from the PSTN to access a VoIP phone 24. Another aspect of the present disclosure allows a legacy phone user (second calling party 2a in FIGS. 1 and 7) to easily place a call to a VoIP device 24 using only the called party's Email address 6. A method 100 is depicted in FIG. 6, wherein a calling party (2a) calls a PSTN gateway number associated with the called party's Email service provider 18 at 102, such as a 1-800 or other universally advertised gateway number for calling subscribing VoIP or SIP devices 24 using ordinary legacy telephones 27 via the PSTN 25. The host of the PSTN VoIP interfacing service, such as the called party's Email service provider web portal 18 in one example, includes a PSTN gateway 16d (FIGS. 1 and 7) that may be any suitable hardware, software, or combinations thereof that is adapted to receive the call and to prompt the caller 2a to speak the called party's Email address at 104 (e.g., "user one at web dash portal dash one dot com" for USER1@WEB-PORTAL-1.COM) or the party's user name (e.g., "user one" for USER1), or alternatively to spell one of these audibly or using keypad entries on a touch tone phone.

At 106, the gateway 16d processes this audio called party information, such as through one or more voice recognition components 17 (FIG. 7), to derive the identity of the called party 26. In one possible implementation, the gateway 16d is implemented in the redirect component 16 as shown in FIGS. 1 and 7, and may consult with the provisioned Email service records 19 to ascertain that the identified user name or Email address belongs to a customer that has subscribed to the call redirect services (e.g., as illustrated at 19a in FIG. 2). The gateway 16d, moreover, may provide audible indications to the caller during the processing at 104 and 106, such as feedback to announce the interpreted user name or Email address to the caller and to allow the caller to confirm or re-enter the information. Moreover, where touch tones are used, the called party identification may include interpretive functions to derive one or more possible matches based on a limited number of tones (e.g., to disambiguate a touch tone for a keypad button "2" corresponding to the number "2" or one of the letters "A" or "B", or "C", etc.). At 108, the gateway 16d validates the called party 26 and forwards the call to the VoIP or SIP device 24 of the called party 26 via the network 8 and the called party's VoIP service provider 22.

In one example, if the PSTN gateway VoIP connection service is provided by the Email provider 18 as shown in FIGS. 1 and 7, the provisioned data 19 will include the subscriber Email addresses (e.g., entry 6), in which case the connection or forwarding of the call is a straightforward process at 108 using the provisioned VoIP device address entry 19b. In another possible implementation, the call redirect components 16, 16c may be implemented separate from the called party's Email service provider 18, in which case the call forwarding or connection at 108 may involve use of the redirect server 16 and the logic 16c to obtain the identified party's VoIP address (e.g., SIP URI), for example, from the provisioned entries 16a and 16b in FIG. 2. In this regard, the redirect components 16, 16c could alternatively be implemented by the VoIP service provider 22 in FIG. 1, or elsewhere in the network, wherein all such variant embodiments are contemplated as falling within the scope of the present disclosure.

The examples of FIGS. 6 and 7 thus advantageously allow VoIP phones or other SIP devices 24 to be called by legacy phones 27 even in situations where the caller 2a only knows or remembers the called party's Email address 6 or the user name portion thereof, or when a called party does not possess a legacy phone number (e.g., to save the expense of the legacy number) by calling a universally advertised legacy phone number, and such features may be provided alone or in combination with the above described call redirect features depicted in FIGS. 1-5 to facilitate ease of use for VoIP or SIP devices in concert with the widespread use of Email and the relative stability (portability) of Email addresses, and while allowing subscribers to readily change VoIP service providers without having to advertise new SIP URIs or other VoIP device addresses, but instead simply reconfiguring their call redirect service settings.

While the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A system for processing calls to a Voice over IP (VoIP) or Session Initiation Protocol (SIP) device, comprising:
   a call redirect component provisioned with a called party's Email address and a called party's VoIP or SIP device address; and
   call redirect service logic operatively associated with the call redirect component to update a Domain Name System (DNS) system with the called party's Email address having a VoIP prefix and an address associated with the call redirect service logic, the call redirect service logic operative to redirect a call associated with the called party's Email address to the called party's VoIP or SIP device address;
   wherein the call redirect component and the call redirect service logic are operatively associated with a web portal of the called party's Email service provider;
   wherein the call redirect component examines a call processing message from a calling party's VoIP or SIP device, and determines whether the called party's VoIP or SIP device address is subscribed to a VoIP call redirect service from a data field at the web portal of the called party's Email service provider; and
   wherein the redirect service logic redirects the call to the called party's VoIP or SIP device address by indicating the called party's VoIP or SIP device address to the calling party's VoIP or SIP device to connect the call by providing the call processing message to a VoIP service provider of a called party's VoIP or SIP device.

2. The system of claim 1, wherein the call redirect service logic is integrated into the call redirect component.

3. The system of claim 1, wherein the call redirect component is a server.

4. The system of claim 1, wherein the call redirect component allows the called party to update at least one of the called party's Email address and the called party's VoIP or SIP device address.

5. The system of claim 1, further comprising a Public Switched Telephone Network (PSTN) gateway component operatively coupled with the call redirect component and coupled to a PSTN network to receive an audio called party username only or a full Email address information from a call from the PSTN network, to correlate the audio called party username or the full Email address with the called party's VoIP or SIP device address, and to forward the call received from the PSTN network to the called party's VoIP or SIP address.

6. The system of claim 1, wherein the call redirect component and the call redirect service logic are hosted by the web portal of the called party's Email service provider to provide the VoIP call redirect service for processing the call to the called party's VoIP or SIP device address.

7. The system of claim 1, wherein the called party's VoIP or SIP device has reconfigurable call redirect service settings to change the VoIP service provider without having to provide a different SIP or VoIP device address to the web portal when the called party's VoIP or SIP device is subscribed to a the VoIP call redirect service of the Email provider in order to have the call redirected from the called party's email address to the called party's VoIP or SIP device.

* * * * *